Jan. 30, 1951     L. N. FORSYTH     2,539,735

FISHHOOK

Filed March 12, 1947

L. N. Forsyth
INVENTOR

BY C. A. Snow & Co.
ATTORNEYS.

Patented Jan. 30, 1951

2,539,735

UNITED STATES PATENT OFFICE 2,539,735

FISHHOOK

Louis N. Forsyth, New Iberia, La.

Application March 12, 1947, Serial No. 734,265

3 Claims. (Cl. 43—43.16)

This invention relates to fish hook construction, the primary object of the invention being to provide a fish hook wherein the pointed or barbed end thereof is so constructed that it will firmly embed itself within the mouth of the fish attempting to remove bait therefrom, the barbed end being designed so that it will not cut itself out when the fish caught by the hook, exerts a pull on the hook.

Another object of the invention is to provide a fish hook barb which is formed with cutting edges to cause the hook to enter the fish more easily than with the hooks of known construction.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1:
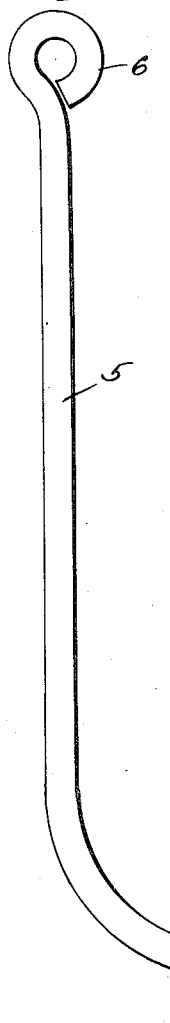
Figure 1 is a side elevational view of a fish hook constructed in accordance with the invention.
Figure 2:
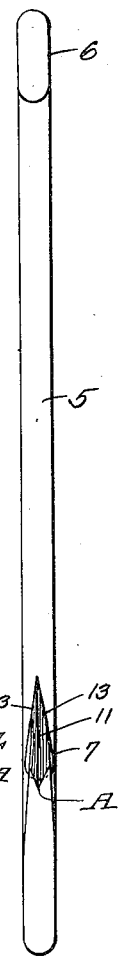
Figure 2 is a front elevational view thereof.
Figure 3:
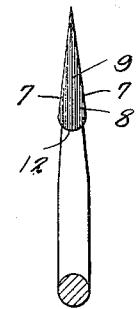
Figure 3 is an elevational view of the pointed end of the hook, the view being taken on line 3—3 of Figure 1.

Referring to the drawing in detail, the fish hook comprises the main portion or shank 5 which is formed with an eye 6 at one end thereof, to which the fishing line is attached, and a barb at its other end disposed at an oblique angle with respect to the shank.

Figure 5:
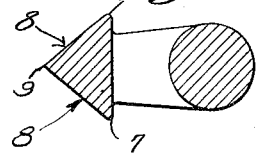
Figure 5 is a sectional view taken on line 5—5 of Figure 1.

The rear end 12 of the barb is substantially triangular in cross-section, as clearly shown by Figure 5 of the drawing, the lower side edges 7 thereof provide lateral cutting edges which are slightly rounded.

The barb has beveled upper surfaces 8 that provide an upper cutting blade 9 that extends throughout the length of the barb to the point thereof.

Figure 4:
Figure 4 is a sectional view taken on line 4—4 of Figure 1.

The forward or pointed end 10 of the barb, is substantially diamond shape in cross-section as shown by Figure 4, the front surfaces of the barb being beveled laterally from a line drawn longitudinally of the center of the front portion of the barb, presenting a forward cutting blade 11 that extends to a point A, where the blade 11 merges with the shank 5 of the hook.

The rear end of the barb, indicated at 12 is rounded and extends an appreciable distance inwardly from the end of the curved portion of the shank, as shown by Figure 1, providing a space between the rear end of the hook and shank to hook into the mouth of the fish and prevent the fish from freeing itself from the hook.

From the foregoing, it will be seen that the barb of the hook will embed itself in the mouth of the fish attempting to remove bait from the hook, the blade formed along the marginal edge of the barb, cutting deep into the mouth of the fish to securely hook the fish.

What is claimed is:

1. In a fish hook, a barb having a rounded rear end and a pointed front end and having beveled upper surfaces which extends from the rounded rear end of the barb to the front pointed end thereof, the lower edges of the beveled upper surfaces of the barb providing lateral cutting edges and an upper cutting blade, the upper cutting blade terminating at the pointed end of the barb.

2. In a fish hook, a shank, a barb disposed at an oblique angle with respect to one end of the shank, said barb having side surfaces, front surfaces a rounded rear end and rounded side edges, the side surfaces of the barb merging into a point, the front surfaces of the barb being beveled providing a forward cutting blade which extends along the front edge of the barb terminating at the point.

3. In a fish hook, a barb having a pointed front end, and a rounded rear end the pointed front end of the barb being substantially diamond shaped in cross section, the rear end of the barb being substantially triangular in cross section, the side edges and rear end of the barb being rounded throughout portions of their lengths, and the front surface of the barb being beveled providing a blade along the outer edge of the barb.

LOUIS N. FORSYTH.

REFERENCES CITED

The following references are of record in the file of this patent:

UNITED STATES PATENTS

| Number | Name | Date |
|--------|------|------|
| 828,505 | Rice | Aug. 14, 1906 |
| 842,594 | Van Vleck | Jan. 29, 1907 |
| 2,164,807 | Evans | July 4, 1939 |